United States Patent [19]

Sugaya

[11] Patent Number: 6,038,061
[45] Date of Patent: *Mar. 14, 2000

[54] DOPED FIBER AMPLIFIER USING BIDIRECTIONAL PUMPING WITH PUMP LIGHTS HAVING DIFFERENT FREQUENCIES

[75] Inventor: Yasushi Sugaya, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/097,816

[22] Filed: Jun. 16, 1998

Related U.S. Application Data

[62] Division of application No. 08/802,881, Feb. 19, 1997, Pat. No. 5,995,275.

[30] Foreign Application Priority Data

Feb. 26, 1996 [JP] Japan .................................. 8-037657

[51] Int. Cl.[7] .............................. H04B 10/16; H01S 3/16; G02B 6/28
[52] U.S. Cl. ........................ 359/337; 359/341; 359/160
[58] Field of Search .................................. 359/337, 341, 359/134, 160; 372/6, 70

[56] References Cited

U.S. PATENT DOCUMENTS

| | | | |
|---|---|---|---|
| 5,497,264 | 3/1996 | Bayart et al. | 359/337 |
| 5,510,926 | 4/1996 | Bayart et al. | 359/179 |
| 5,664,131 | 9/1997 | Sugiya | 359/341 |
| 5,764,404 | 6/1998 | Yamane et al. | 359/341 |

OTHER PUBLICATIONS

Lipka, et al; Electronics Letters, vol. 30, #23, pp. 1940–1941; abstract only herewith, Nov. 10, 1994.

*Primary Examiner*—Nelson Moskowitz
*Attorney, Agent, or Firm*—Staas & Halsey

[57] ABSTRACT

A doped fiber amplifier which provides bidirectional pumping to amplify a signal light, and reduces instability of gain caused by the bidirectional pumping. The doped fiber amplifier includes a rare earth element doped optical fiber, a first light source and a second light source. The optical fiber has first and second ends, with the signal light propagating through the optical fiber from the first end to the second end. The first light source provides pump light which propagates in the optical fiber from the first end to the second end and is at a first wavelength. The second light source provides pump light which propagates in the optical fiber from the second end to the first end and is at a second wavelength. The first wavelength is different from the second wavelength. The pump light provided by the first and second light sources causes the signal light to be amplified as the signal light propagates through the optical fiber.

20 Claims, 8 Drawing Sheets

DOPED FIBER AMPLIFIER USING BIDIRECTIONAL PUMPING WITH PUMP LIGHTS HAVING DIFFERENT FREQUENCIES

This application is a divisional of application Ser. No. 08/802,881, filed Feb. 19, 1997, now U.S. Pat. No. 5,995,275.

CROSS-REFERENCE TO RELATED APPLICATIONS

This application is based on, and claims priority to, Japanese patent application number 08-037657, filed on Feb. 26, 1996, in Japan, and which is incorporated herein by reference.

BACKGROUND OF THE INVENTION

1. Field of the Invention

The present invention relates to an optical amplifier, such as a doped fiber amplifier, using bidirectional pumping to amplify a signal light propagating through a doped optical fiber. More particularly, the present invention relates the relationship between the wavelengths of the pump light used for bidirectional pumping, and to the control of the pump light to adjust tilt gain of the doped fiber amplifier.

2. Description of the Related Art

There is increasing demand for communication systems, such as multimedia networks, which can provide high speed transmission and large bandwidth. Moreover, optical communication systems which use wavelength division multiplexing (WDM) promise to provide such high speed transmission and large bandwidth.

In optical communication systems which use WDM, a rare earth element doped fiber amplifier is typically used to amplify optical signals since this type of doped fiber amplifier has a relatively wide gain band. A wide gain band is generally required to amplify all the channels which may be included in a wavelength division multiplexed signal light.

In such a rare earth element doped fiber amplifier, either forward pumping or backward pumping can be used to amplify signal light. With forward pumping, a light source produces pump light which propagates through the fiber in the same direction as the signal light propagates. The forward travelling pump light interacts with the rare earth element doped fiber to amplify the signal light. With backward pumping, a light source produces pump light which propagates through the fiber in the opposite direction as the signal light propagates. The backward travelling pump light interacts with the rare earth element doped fiber to amplify the signal light. With bidirectional pumping, both forward and backward pump light are provided in the fiber, so that the signal light is amplified by both the forward and backward pump light.

Unfortunately, with bidirectional pumping, one of the light sources providing pump light will be influenced by pump light provided by the other light source. For example, a light source providing the forward pump light may be influenced by the backward pump light. Similarly, a light source providing the backward pump light may be influenced by the forward pump light. As a result, the gain of the doped fiber amplifier becomes instable.

SUMMARY OF THE INVENTION

Accordingly, it is an object of the present invention to provide a doped fiber amplifier which uses bidirectional pumping and provides a stable gain.

It is an additional object of the present invention to provide a doped fiber amplifier which uses bidirectional pumping, wherein a relationship between the wavelength of forward pump light and the wavelength of backward pump light provides a stable gain.

Objects of the present invention are achieved by providing an apparatus, such as a doped fiber amplifier, for amplifying a signal light. The apparatus includes an optical fiber, a first light source and a second light source. The optical fiber has first and second ends, with the signal light propagating through the optical fiber from the first end to the second end. The first light source provides pump light which propagates in the optical fiber from the first end to the second end and is at a first wavelength. The second light source provides pump light which propagates in the optical fiber from the second end to the first end and is at a second wavelength. The first wavelength is different from the second wavelength. The pump light provided by the first and second light sources causes the signal light to be amplified as the signal light propagates through the optical fiber.

Objects of the present invention are also achieved by providing a gain tilt control unit which monitors amplified spontaneous emission (ASE) in the optical fiber, determines a gain tilt of the apparatus from the monitored ASE, and controls the power of the pump light produced by the first light source and/or the power of the pump light produced by the second light source, to control the gain tilt. Preferably, the tilt gain control unit controls the tilt gain to be constant.

Objects of the present invention are also achieved by providing an apparatus for amplifying a signal light, wherein the apparatus includes an optical fiber, a light source and a gain tilt control unit. The signal light propagates through the optical fiber. The light source provides pump light which propagates in the optical fiber and causes the signal light to be amplified as the signal light propagates through the optical fiber. The gain tilt control unit monitors amplified spontaneous emission (ASE) in the optical fiber, determines a gain tilt of the apparatus from the monitored ASE, and controls the power of the pump light produced by the light source to control the gain tilt.

Objects of the present invention are also achieved by providing a method for amplifying a signal light propagating through an optical fiber. The method includes the steps of (a) propagating the signal light through the optical fiber from a first end to a second end of the optical fiber, (b) propagating first pump light at a first wavelength in the optical fiber from the first end to the second end so that the first pump light causes the signal light to be amplified as the signal light propagates through the optical fiber, and (c) propagating second pump light at a second wavelength in the optical fiber from the second end to the first end so that the second pump light causes the signal light to be amplified as the signal light propagates through the optical fiber, the first wavelength being a different wavelength than the second wavelength.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
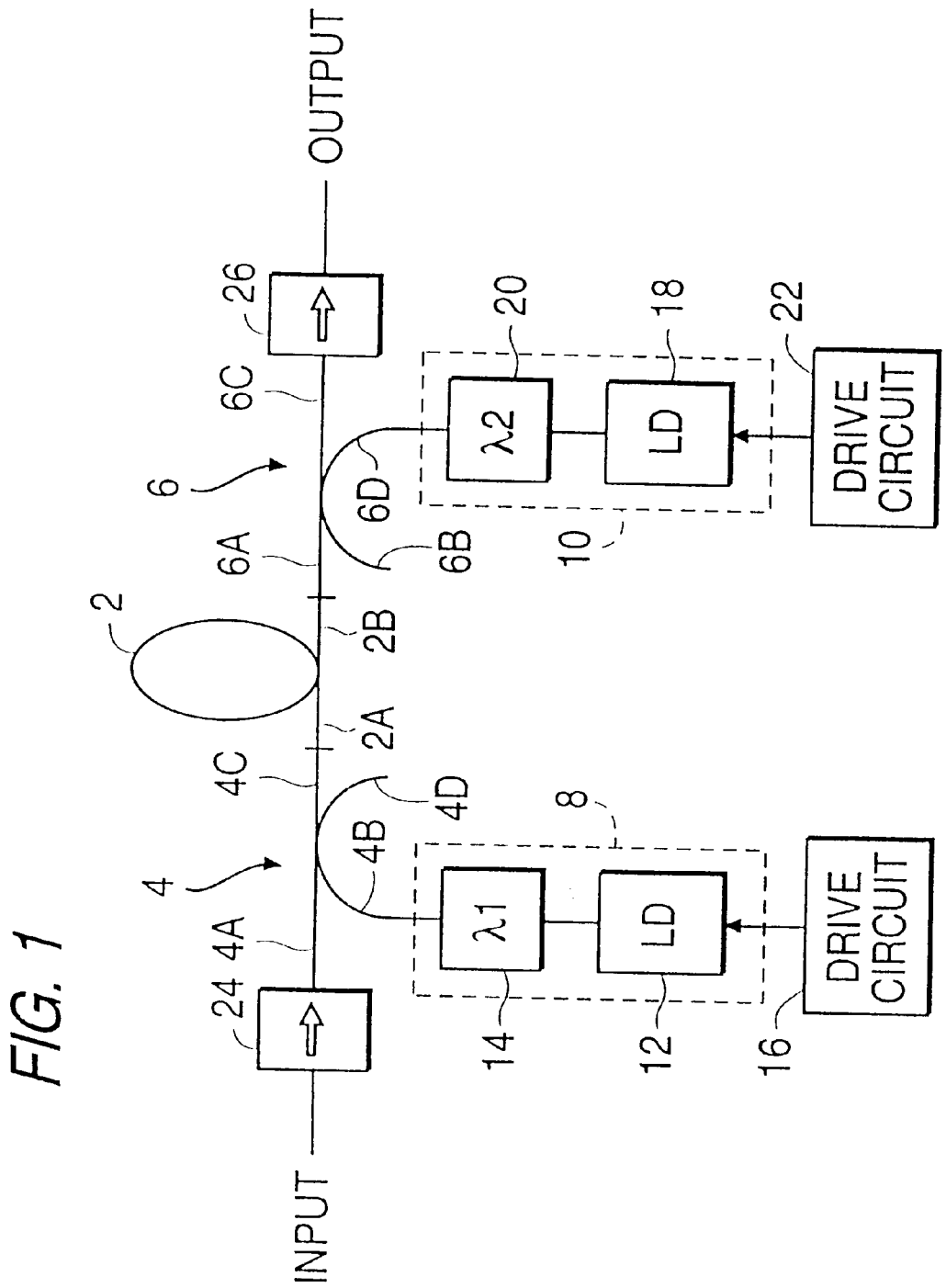
FIG. 1 is a diagram illustrating a doped fiber amplifier, according to an embodiment of the present invention.

Reference will now be made in detail to the preferred embodiments of the present invention, examples of which are illustrated in the accompanying drawings, wherein like reference numerals refer to the same or similar elements throughout.

FIG. 1 is a diagram illustrating a doped fiber amplifier, according to an embodiment of the present invention. Referring now to FIG. 1, the doped fiber amplifier includes a doped fiber 2 having a first end 2A and a second end 2B. Signal light propagates in a propagation direction in doped fiber 2 from first end 2A to second end 2B. Thus, first end 2A of doped fiber 2 corresponds to an upstream side of the propagation direction, and second end 2B corresponds to a downstream side of the propagation direction. Doped fiber 2 is doped with a rare earth element. Selection of an appropriate rare earth element depends, in part, on the wavelength of the signal light. In the following description, it is assumed that the signal light falls within a 1.55 µm band, and that doped fiber 2 is doped with the rare earth element erbium (Er) since erbium is a preferable dopant for signal light in the 1.55 µm band.

A WDM optical coupler 4 connects a pump light source 8 to first end 2A of doped fiber 2, and a WDM optical coupler 6 connects a pump light source 10 to second end 2B of doped fiber 2. Pump light sources 8 and 10 each provide pump light in a 0.98 µm band, since pump light in a 0.98 µm band is ideally suited to amplify a signal light which is in a 1.55 µm band and is propagating in an erbium doped fiber.

Optical coupler 4 has ports 4A, 4B, 4C, and 4D. Port 4D is terminated by an antireflection coating. Signal light having a wavelength in a 1.55 µm band is supplied to port 4A and is output from port 4C to first end 2A of doped fiber 2. Pump light having a wavelength in a 0.98 µm band is supplied to port 4B from pump light source 8 and is output from port 4C to first end 2A of doped fiber 2.

Similarly, optical coupler 6 has ports 6A, 6B, 6C, and 6D. Port 6B is terminated by an antireflection coating. Signal light having a wavelength in a 1.55 µm band is supplied to port 6A from doped fiber 2 and is output from port 6C. Pump light having a wavelength in a wavelength in a 0.98 µm band is supplied to port 6D from pump light source 10 and is output from port 6A to second end of doped fiber 2.

Pump light source 8 includes a laser diode 12 operating in a wavelength band of 0.98 µm and a reflection type optical device 14 provided between laser diode 12 and port 4B of optical coupler 4. Laser diode 12 is supplied with a direct-current or controlled drive current (bias current) from a drive circuit 16.

Similarly, pump light source 10 includes a laser diode 18 operating in a wavelength band of 0.98 µm and a reflection type optical device 20 provided between laser diode 18 and port 6D of optical coupler 6. Laser diode 18 is supplied with a direct-current or controlled drive current from a drive circuit 22.

Signal light is supplied through an optical isolator 24 to port 4A of optical coupler 4. Pump lights provided by pump light source 8 and pump light source 10 cause the signal light to be amplified as the signal light propagates through doped fiber 2. The amplified signal light is output from port 6C of optical coupler 6 and passes through an optical isolator 26.

Figure 2:
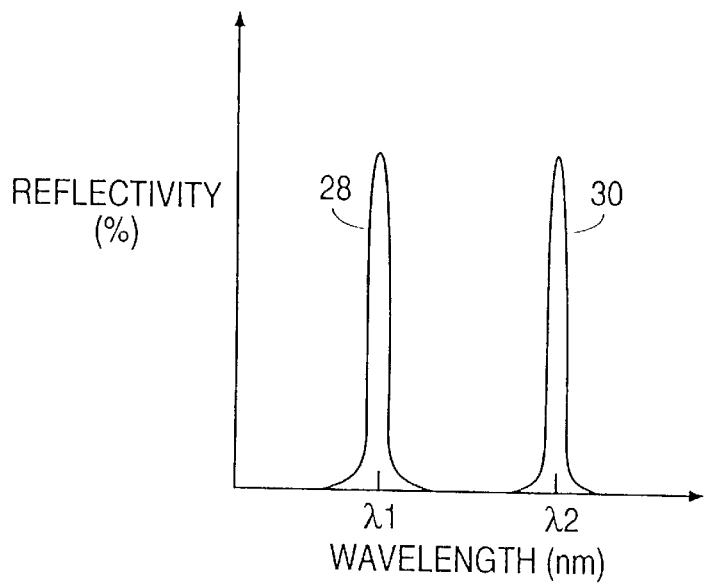
FIG. 2 is a graph illustrating characteristics of a reflection type optical device, according to an embodiment of the present invention.

FIG. 2 is a graph illustrating characteristics of a reflection type optical device, according to an embodiment of the present invention. More specifically, referring now to FIG. 2, curve 28 illustrates the characteristics of reflection type optical device 14, and curve 30 illustrates the characteristics of reflection type optical device 20. In FIG. 2, the vertical axis represents reflectivity (%) and the horizontal axis represents wavelength (nm).

As illustrated by curve 28, reflection type optical device 14 has a selectivity of wavelength in a narrow band having a center wavelength $\lambda_1$. Similarly, as illustrated by curve 30, reflection type optical device 20 has a selectivity of wavelength in a narrow band having a center wavelength $\lambda_2$ ($\lambda_1 \neq \lambda_2$).

The wavelengths $\lambda_1$ and $\lambda_2$ fall within a 0.98 µm band selected from 0.98 µm bands used as pump bands for an erbium doped fiber (EDF). A detuning quantity ($|\lambda_1-\lambda_2|$) is preferably greater than or equal to 5 nm. While FIG. 2 shows that the wavelength $\lambda_2$ is shifted from the wavelength $\lambda_1$ to the longer wavelength side, the side of shifting of the wavelengths $\lambda_1$ and $\lambda_2$ from each other is arbitrary.

Figure 3A:
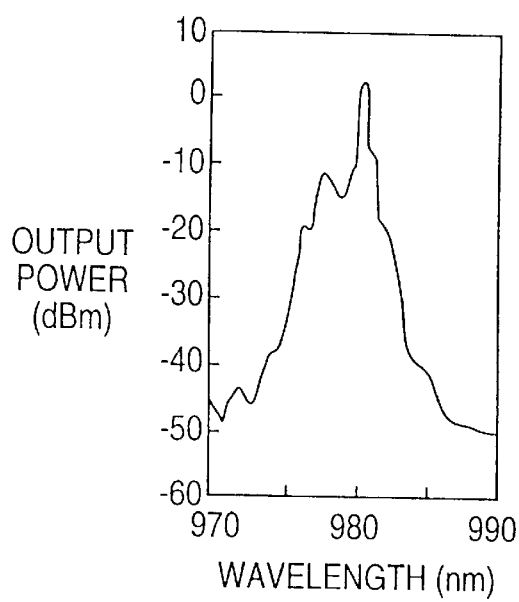
FIGS. 3(A) and 3(B) are graphs illustrating the spectra of a pump light source, according to embodiments of the present invention.
Figure 3B:
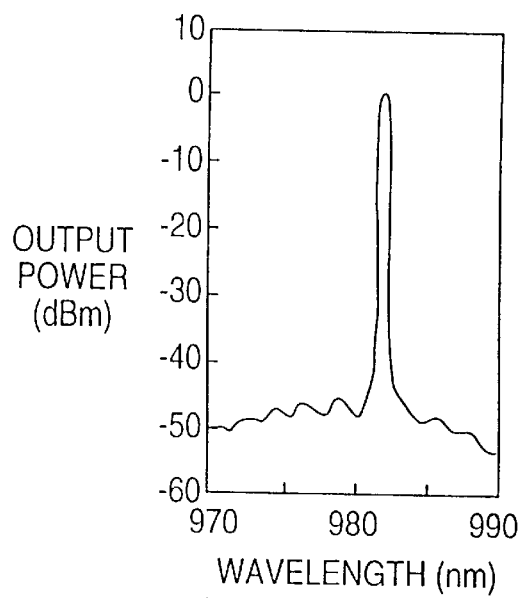

FIGS. 3(A) and 3(B) are graphs illustrating spectra of a pump light source, such as pump light sources 8 and 10, according to embodiments of the present invention. For example, FIG. 3(A) illustrates the spectrum of light output from laser diode 12 of pump light source 8, and FIG. 3(B) illustrates the spectrum of light output from reflection type optical device 14.

As illustrated in FIG. 3(A), the light output from laser diode 12 has a relatively wide spectrum. As illustrated in FIG. 3(B), the light output from reflection type optical device 14 and supplied to doped fiber 2 has a relatively narrow spectrum. Thus, reflection type optical device 14 functions to narrow to spectrum of light output from laser diode 12.

Reflection type optical devices 14 and 20 can be, for example, a Bragg reflection grating fiber or an interference optical film, such as a dielectric multilayer film.

Figure 4A:
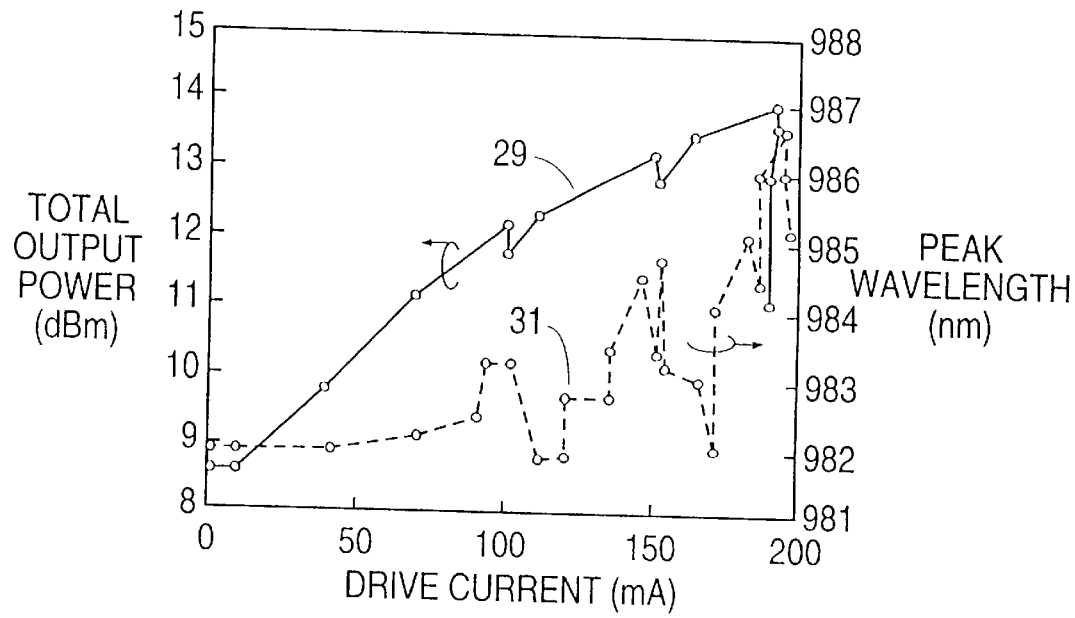
FIGS. 4(A) and 4(B) are graphs illustrating instability of gain of a doped fiber amplifier.
Figure 4B:
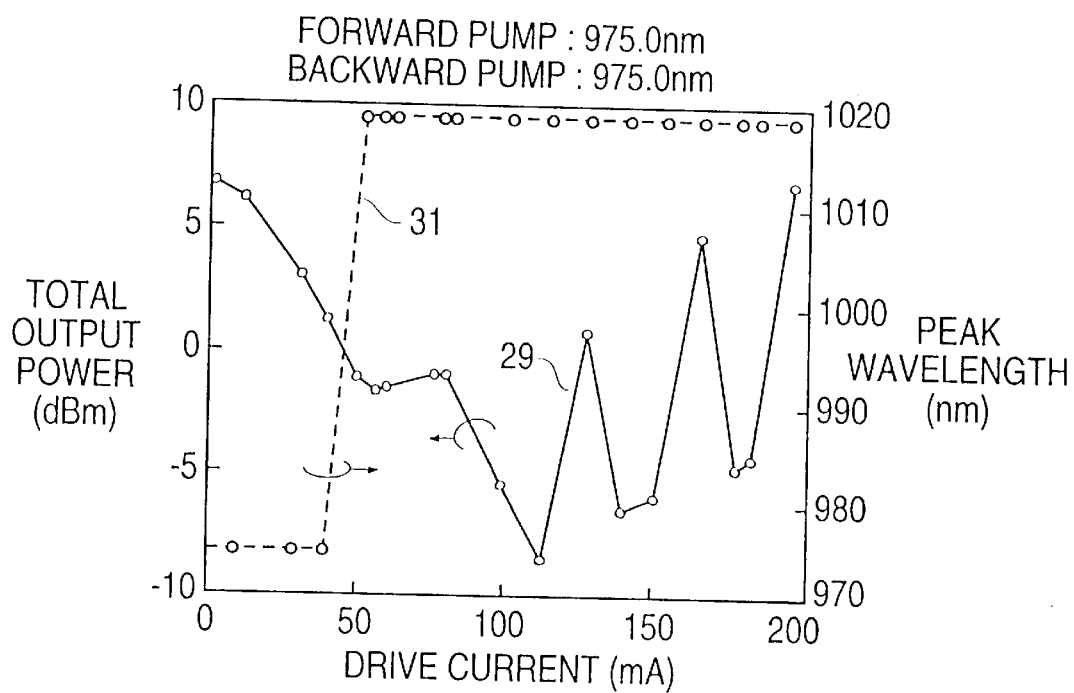

FIGS. 4(A) and 4(B) are graphs illustrating instability of gain of a doped fiber amplifier. In FIGS. 4(A) and 4(B), a solid line curve 29 represents the relation between total output power (dBm) of a doped fiber amplifier and drive current (mA) of a laser diode providing pump light, and a broken line curve 31 represents the relation between peak wavelength (nm) of the spectrum and drive current (mA).

More specifically, FIG. 4(A) shows characteristics of the doped fiber amplifier illustrated in FIG. 1, in the case that reflection type optical devices 14 and 20 have been removed. That is, FIG. 4(A) shows measured changes in the total output power and the peak wavelength when a constant drive current is supplied to laser diode 12 for forward pumping (full pumping) and a drive current supplied to laser diode 18 for backward pumping is changed. As can be seen from FIG. 4(A), both the total output power and the peak wavelength change discontinuously with an increase in the drive current.

Such instability of gain is due to the fact that the spectrum of pump lights output from laser diodes 12 and 18 is wide, as shown in FIG. 3(A), and thereby influence each other. More specifically, after the forward pump light supplied from laser diode 12 to doped fiber 2 contributes to optical amplification, a residual portion of the forward pump light is supplied through optical coupler 6 to pump light source 10. This residual portion causes the oscillation of laser diodes 18 to become instable. Similarly, after the backward pump light supplied from laser diode 18 to doped fiber 2 contributes to optical amplification, a residual portion of the backward pump light is supplied through optical coupler 4 to pump light source 8. This residual portion causes the oscillation of laser diode 12 to become instable.

FIG. 4(B) shows characteristics of the doped fiber amplifier illustrated in FIG. 1, including reflection type optical devices 14 and 20, and where the center wavelength of reflection type optical device 14 and center wavelength of reflection type optical device 20 are coincident with each other. Specifically, both the wavelength of the forward pump light and the wavelength of the backward pump light are set to 975.0 nm.

FIG. 4(B) shows changes in the total output power and the peak wavelength when full pumping is maintained by laser diode 12 and the drive current supplied to laser diode 18 is changed. As can be seen from FIG. 4(B), when the drive current exceeds 50 mA, oscillation at a wavelength of 1020 nm occurs from the interaction between pump light sources 8 and 10, thereby causing a reduction in pumping efficiency.

Thus, in the case that the spectrum of the forward pump light and the spectrum of the backward pump light are narrowed, and the wavelengths of the forward pump light and the backward pump light are coincident with each other, the gain experiences relatively high instability.

Figure 5:
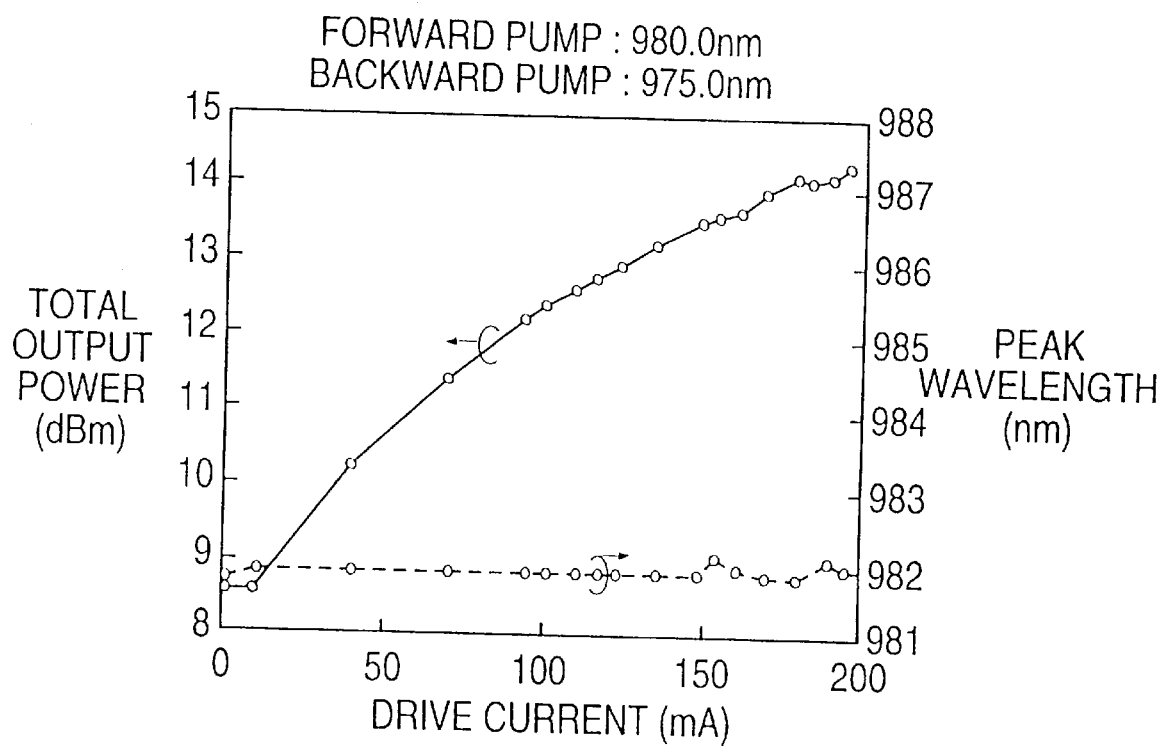
FIG. 5 is a graph illustrating stability of gain of a doped fiber amplifier, according to embodiments of the present invention.

FIG. 5 is a graph illustrating stability of gain of the doped fiber amplifier illustrated in FIG. 1, where the wavelength of the forward pump light is set to 980.0 nm, and the wavelength of the backward pump light is set to 975.0 nm. More specifically, FIG. 5 shows changes in the total output power and the peak wavelength when full pumping is maintained by laser diode 12 and the drive current supplied to laser diode 18 is changed.

As can be seen from FIG. 5, the total output power increases continuously with an increase in the drive current, thereby providing a stable gain. Thus, by making the wavelength of the forward pump light and the wavelength of the backward pump light different from each other, the interaction between two pump light sources 8 and 10 is suppressed and the gain is stabilized.

Figure 6:
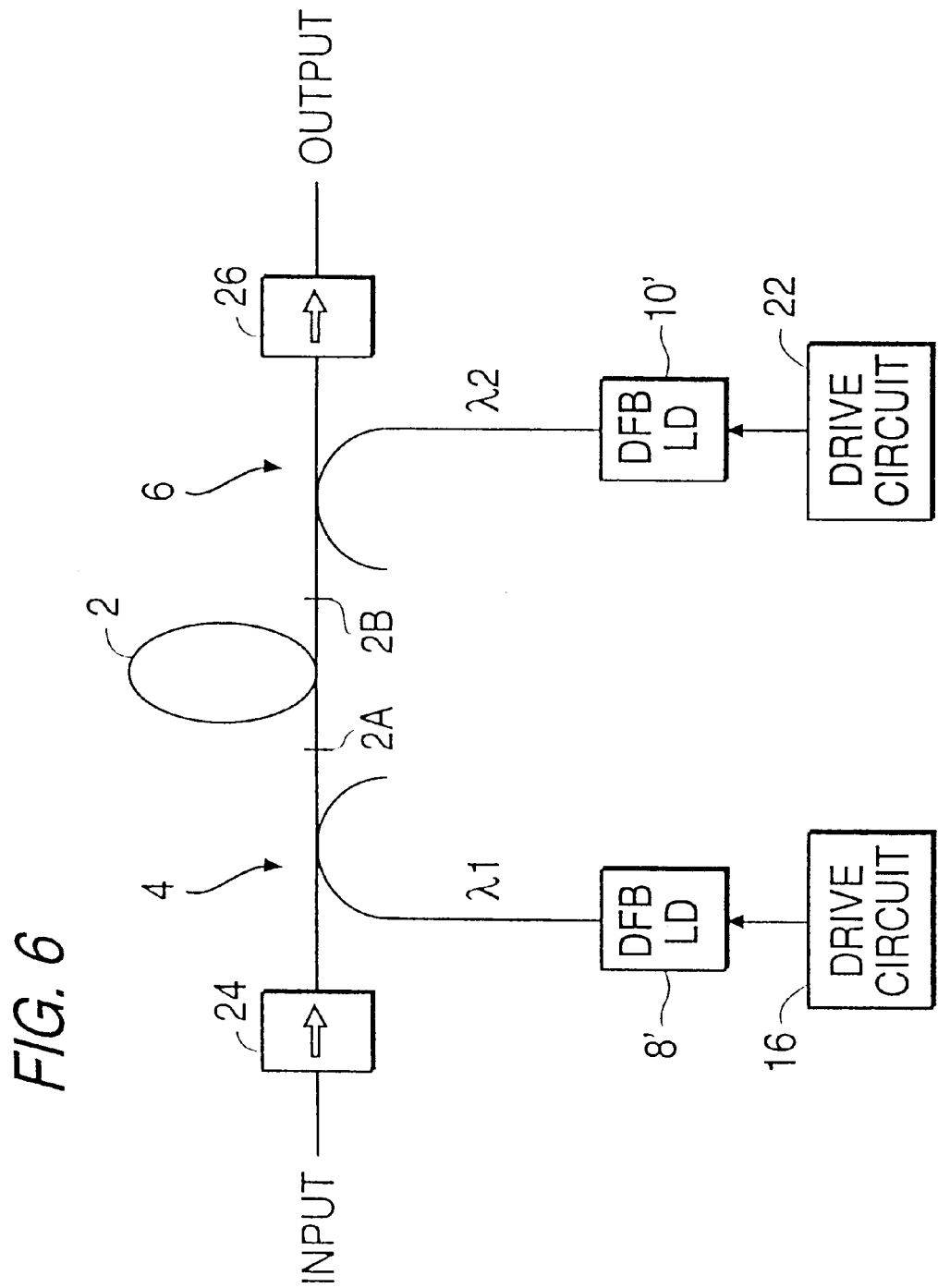
FIG. 6 is a diagram illustrating a doped fiber amplifier, according to an additional embodiment of the present invention.

FIG. 6 is a diagram illustrating a doped fiber amplifier, according to an additional embodiment of the present invention. Referring now to FIG. 6, distributed-feedback (DFB) type laser diodes (LD) 8' and 10' are used instead of pump light sources 8 (see FIG. 1) and 10 (see FIG. 1). DFB laser diode 8' operates in a single mode in a wavelength band having a center wavelength $\lambda_1$, to provide forward pumping. DFB laser diode 10' operates in a single mode in a wavelength band having a center wavelength $\lambda_2$, to provide backward pumping. As previously described, the wavelengths $\lambda_1$ and $\lambda_2$ fall within a pump band of 0.98 μm, and are different from each other.

As illustrated in FIG. 6, bidirectional pumping is performed by two laser diodes each operating in a single mode. Accordingly, the gain of the doped fiber amplifier can be stabilized without using reflection type optical devices.

Figure 7:
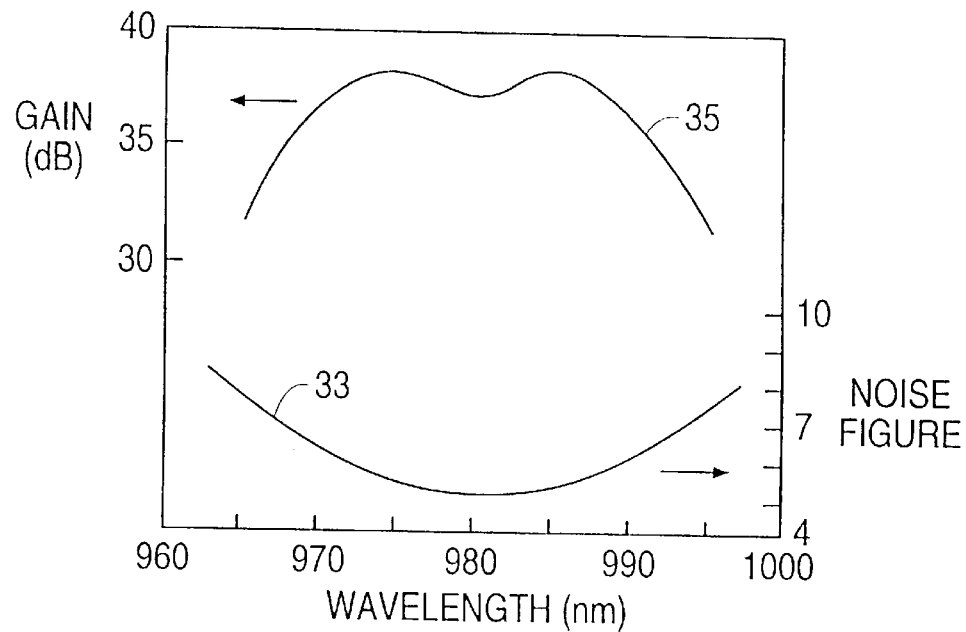
FIG. 7 is a graph illustrating wavelength characteristics of gain and noise figure.

FIG. 7 is a graph illustrating wavelength characteristics of gain and noise figure of a doped fiber amplifier as illustrated in FIGS. 1 and 6. In FIG. 7, the vertical axes represent gain (dB) and noise figure (dB), and the horizontal axis represents wavelength (nm) of pump light in forward pumping or backward pumping. Thus, curve 33 represents a noise figure curve, and curve 35 represents a gain curve.

Referring now to FIG. 7, in an erbium doped fiber (EDF), such as doped fiber 2, a wavelength $\lambda_{minNF}$ providing a minimum noise figure is 980 nm, and wavelengths $\lambda_{maxG}$ providing a maximum gain are 975 nm and 985 nm. Further, a preferable pump band of 0.98 μm that can provide a sufficient gain for actual use ranges from 965 nm to 995 nm.

Preferably, the wavelength $\lambda_1$ of the forward pump light is set equal to $\lambda_{minNF}$ so that a low noise figure is achieved at the upstream side of doped fiber 2 where signal light has not yet been highly amplified. That is, the wavelength $\lambda_1$ of the forward pump light is set substantially equal to 980 nm, and the wavelength $\lambda_2$ of the backward pump light is set to fall substantially within the range of 965 nm to 995 nm, thereby obtaining a doped fiber amplifier having a stable gain and relatively low noise Therefore, when the wavelength $\lambda_1$ of the forward pump light is set equal to $\lambda_{minNF}$ and the wavelength $\lambda_2$ of the backward pump light is set equal to $\lambda_{maxG}$, it is possible to provide a doped fiber amplifier having a stable gain, a low noise, and a high output. Specifically, in this case, the wavelength $\lambda_2$ of the backward pump light is preferably set to 975 nm or 985 nm.

According to the above embodiments of the present invention, the wavelength $\lambda_1$ of the forward pump light and the wavelength $\lambda_2$ of the backward pump light fall within the same pump band, where $\lambda_1 \neq \lambda_2$. The pump band is determined so that a doped optical fiber of a doped fiber amplifier has a gain band which includes the wavelength of signal light to be amplified. For example, in the case that an optical fiber is doped with erbium for amplifying signal light falling within a 1.55 μm band, the pump band may be, for example, a 0.82 μm band, a 0.98 μm band or a 1.48 μm band. Preferably, the 0.82 μm band is defined by wavelengths between 0.80 μm and 0.84 μm, the 0.98 μm band is defined by wavelengths between 0.96 μm and 1.00 μm, and the 1.48 μm band is defined by wavelengths between 1.46 μm and 1.50 μm. However, the present invention is not intended to be limited to these precise pump bands, and the ranges of the bands can easily be changed. For example, another, more precise, preferably range for the 0.98 μm band is between 0.965 μm and 0.995 μm.

Optical repeaters are used to provide long distance optical communication. Thus, optical repeaters are often laid underneath the ocean to provide optical communication between continents. Such optical repeaters typically include a doped fiber amplifier. Therefore, it is preferably for a doped fiber amplifier used in an optical repeater to provide redundant functions, since it is difficult to repair or maintain an optical repeater laid underneath the ocean.

A doped fiber amplifier which uses bidirectional pumping, such as the doped fiber amplifiers illustrated in FIGS. 1 and 6, can provide the needed redundancy since one of the pump light sources will still amplify signal light propagating through the optical fiber when the other pump light source has failed. In this case, by setting a noise figure and a gain provided by the wavelength $\lambda_1$ of the forward pump light substantially equal to a noise figure and a gain provided by the wavelength $\lambda_2$ of the backward pump light, a constant noise figure or gain tilt can be maintained even when one of the two pump lights is reduced in power to cause a change in power balance.

For example, as illustrated in FIG. 7, gain curve 35 and noise figure curve 33 have shapes which are symmetrical with respect to $\lambda_{minNF}$, so that $\lambda_{minNF}$ is substantially equal to $(\lambda_1+\lambda_2)/2$. Specifically, one of $\lambda_1$ and $\lambda_2$ is preferable equal to 975 nm or 985 nm, and the other of $\lambda_1$ and $\lambda_2$ is preferable equal to the other of 975 nm or 985 nm.

Figure 8:
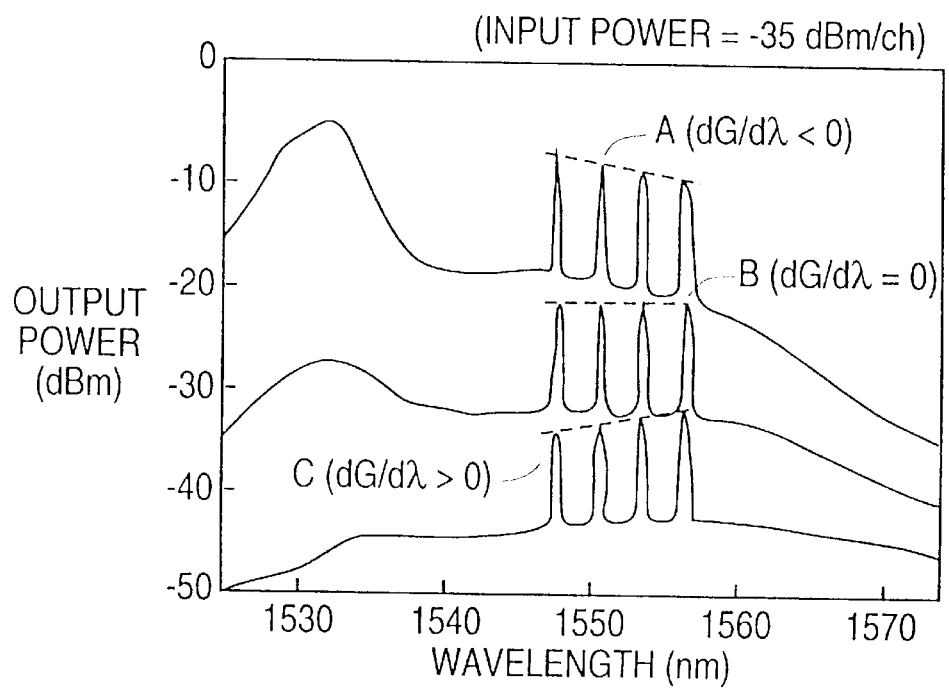
FIG. 8 is a graph illustrating gain tilt of a doped fiber amplifier.

FIG. 8 is a graph illustrating gain tilt of a doped fiber amplifier which uses an erbium doped fiber. More specifically, FIG. 8 shows spectra of a WDM signal light amplified by such a doped fiber amplifier. The WDM signal light includes four signal lights, or channels, having wavelengths of 1548 nm, 1551 nm, 1554 nm, and 1557 nm, respectively. Each of the channels of the WDM signal light are input to the doped fiber amplifier with the same input power (−35 dBm/ch). In FIG. 8, the vertical axis represents output power (dBm) and the horizontal axis represents wavelength (nm).

The spectrum "A" illustrated in FIG. 8 corresponds to the case where the power of pump light is relatively large. In this case, a negative gain tilt occurs. That is, the differential of gain with respect to wavelength is negative (dG/dλ<0).

The spectrum "C" illustrated in FIG. 8 corresponds to the case where the power of pump light is relatively small. In this case, a positive gain tilt is obtained (dG/dλ>0).

The spectrum "B" illustrated in FIG. 8 corresponds to the case where the power of pump light is optimum such that no gain tilt occurs. In this case, the differential of gain with respect to wavelength is 0 (dG/dλ=0).

Each spectrum shown in FIG. 8 has a shape in which four sharp spectra corresponding to the four channels of the WDM signal light are superimposed on a gentle spectrum of amplified spontaneous emission (ASE). The wavelength range where ASE is generated so as to obtain such a gain is referred to as a "gain band" of the doped fiber amplifier.

In a doped fiber amplifier, gain characteristics of signals are reflected on a spectrum of ASE. Accordingly, the gain tilt of a doped fiber amplifier can be detected by monitoring ASE. Therefore, based on a monitored ASE, the gain tilt can be feedback-controlled so as to become flat or constant. This concept will now be described in more detail below.

Figure 9:
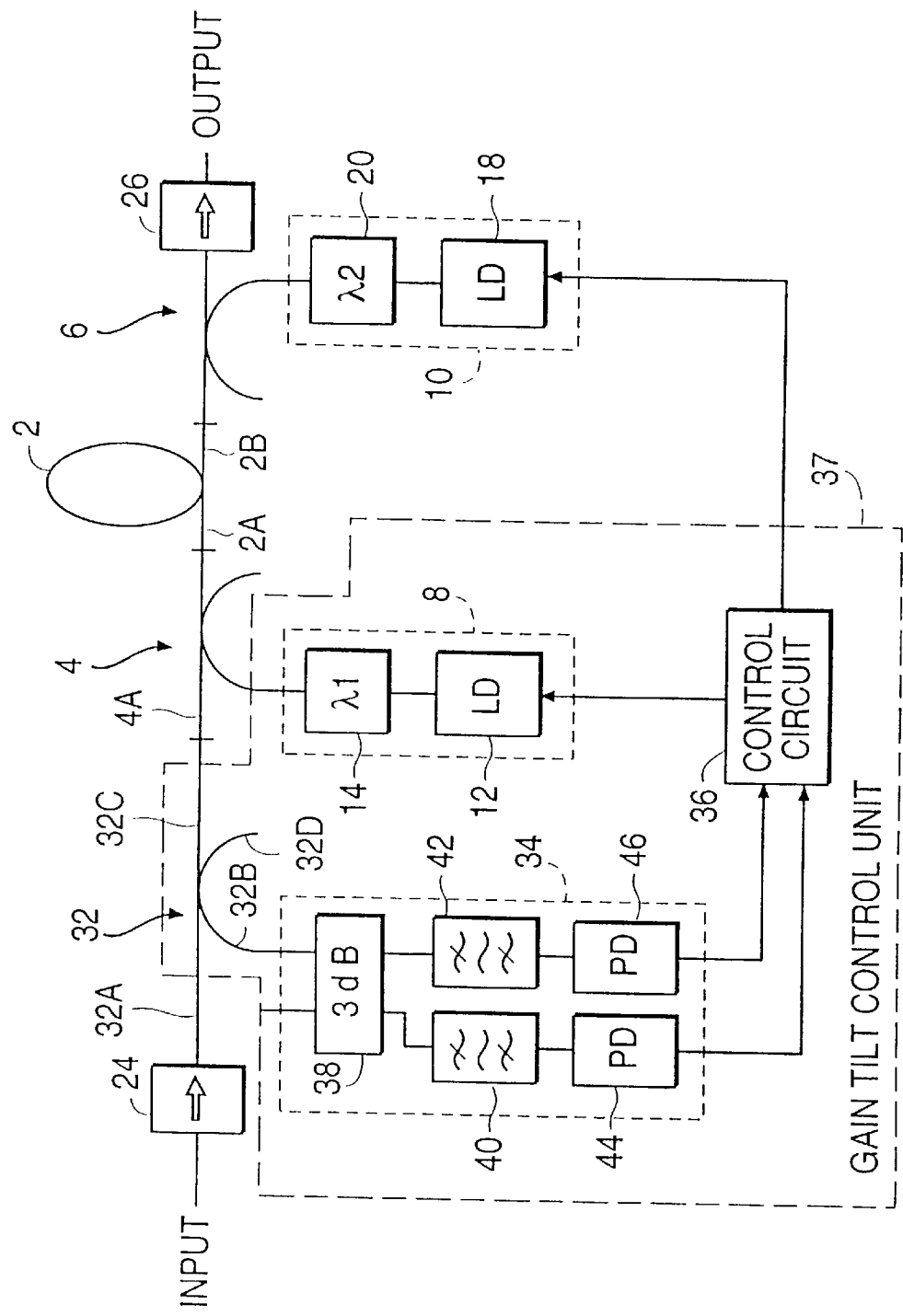
FIG. 9 is a diagram illustrating a doped fiber amplifier, according to a further embodiment of the present invention.

FIG. 9 is a diagram illustrating a doped fiber amplifier, according to a further embodiment of the present invention. The doped fiber amplifier illustrated in FIG. 9 is similar to the doped fiber amplifier illustrated in FIG. 1, but includes a gain tilt control unit 37 which monitors ASE in doped fiber 2, determines a gain tilt from the monitored ASE and controls pump light to control the tilt gain.

More specifically, tilt gain control unit 37 includes an optical coupler 32 connected to first end 2A of doped fiber 2 for extracting ASE from first end 2A, a monitor 34 for receiving the ASE to detect a gain tilt in doped fiber 2, and a control circuit 36 for controlling at least one of drive currents for laser diodes 12 and 18 so that the gain tilt detected by monitor 34 becomes flat or constant.

Optical coupler 32 has ports 32A, 32B, 32C, and 32D. Port 32D is preferably an angle cut fiber end, or is terminated by an antireflection coating, to reduce reflection. Almost all of the light supplied to port 32A is output from port 32C, and a portion of light supplied to port 32C is output from port 32B. Port 32A is connected to an output port of optical isolator 24, and port 32C is connected to port 4A of optical coupler 4.

Gain tilt monitor 34 includes an optical coupler 38 (such as a 3-dB coupler), optical band-pass filters 40 and 42, and photodetectors (PD) 44 and 46. Photodetectors 44 and 46 are preferably photodiodes. Optical coupler 38 receives ASE output from port 32B of optical coupler 32 and branches the ASE into a first branched signal light and a second branched signal light. Optical band-pass filter 40 has a pass band included in a gain band of doped fiber 2, for receiving the first branched light. Photodetector 44 converts the optical signal output from optical band-pass filter 40 into an electrical signal. Optical band-pass filter 42 has a pass band included in the gain band, but different from the pass band of optical band-pass filter 40, for receiving the second branched light. Photodetector 46 converts the optical signal output from optical band-pass filter 42 into an electrical signal.

Control circuit 36 controls a drive current of laser diode 12 and/or laser diode 18 so that the ratio between output signals from photodetectors 44 and 46 becomes constant (for example, 1:1) Drive circuits 16 (see FIG. 1) and 22 (see FIG. 1) are included in control circuit 36 illustrated in FIG. 9.

For example, in the gain band shown in FIG. 8, the center wavelength in the pass band of optical band-pass filter 40 is set to 1540 nm, and the center wavelength of the pass band of optical band-pass filter 42 is set to 1560 nm. In this manner, the gain tilt can be monitored by detecting the ratio between powers of the ASEs limited by the two pass bands.

A flat gain tilt, for example, can be obtained by performing feedback control such that the levels of electrical output signals from photodetectors 44 and 46 becomes constant. Thus, with a doped fiber amplifier as illustrated in FIG. 9, a stable gain and a constant gain tilt can be provided.

Figure 10:
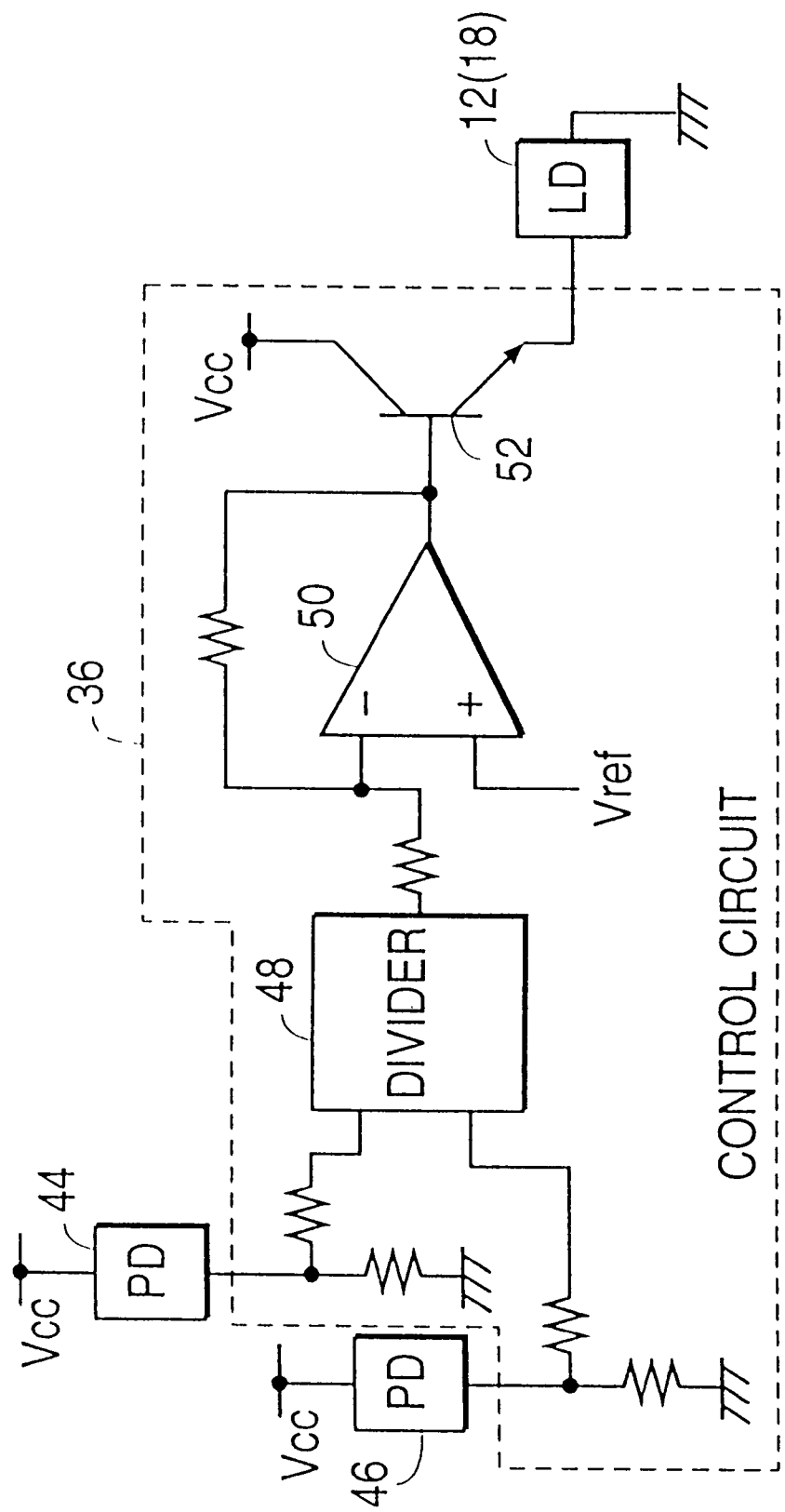
FIG. 10 a diagram illustrating a control circuit as illustrated in FIG. 9, according to an embodiment of the present invention.

FIG. 10 a diagram illustrating control circuit 36, according to an embodiment of the present invention. Referring now to FIG. 10, in the case that photodetectors 44 and 46 are photodiodes, photocurrents flowing in the photodiodes are converted into voltage signals which are supplied to input ports of a divider 48.

An output level of divider 48 corresponding to the ratio between input voltage signals is compared with a reference voltage $V_{REF}$ in an operational amplifier 50, and laser diode 12 (or 18) is driven according to a difference between the output level and the reference voltage $V_{REF}$. A power transistor 52 generates a drive current.

The above-described feedback control for providing a constant gain tilt is especially effective in the case that a noise figure and a gain provided by the wavelength of forward pump light are substantially equal to a noise figure and a gain provided by the wavelength of backward pump light. That is, according to the above embodiments of the present invention, in the case that one of the two pump light sources is deteriorated, a change in gain tilt can be prevented.

In the above embodiments of the present invention, the wavelength of the signal light preferable falls within a 1.55 μm band, and erbium is a dopant of the doped fiber. In this case, the pump band is set to preferably a 0.98 μm band, so as to obtain a low noise figure and a high pumping efficiency.

Alternatively, the pump band may be set to a 1.48 μm band, so as to obtain a doped fiber amplifier having high output power. However, the present invention is not intended to be limited to signal light within a specific band, pump light within a specific band, or the use of a specific rare earth element as a dopant. Instead, various different rare earth elements, amplification bands, and pump bands can be selected based on the specific requirements of the communication system.

According to the above embodiments of the present invention, a doped fiber amplifier is provided which uses bidirectional pumping, but reduces instability of gain caused by the bidirectional pumping.

Various optical components described herein are "operatively connected" to each other. The term "operatively connected" refers to optical components being directly connected together by fiber connection, spatially connected using a collimated beam, or connected through another optical component such as an optical filter.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for amplifying a signal light, comprising:

an optical fiber having first and second ends, the signal light propagating through the optical fiber from the first end to the second end;

a first light source providing pump light which propagates in the optical fiber from the first end to the second end and is at a first wavelength;

a second light source providing pump light which propagates in the optical fiber from the second end to the first end and is at a second wavelength which is different from the first wavelength, the pump light provided by the first and second light sources causing the signal light to be amplified as the signal light propagates through the optical fiber; and a gain tilt control unit which monitors amplified spontaneous emission (ASE) at different wavelengths in the optical fiber, determines a gain tilt of the apparatus from a difference of the monitored ASE at the different wavelengths, and controls at least one of the group consisting of the power of the pump light produced by the first light source and the power of the pump light produced by the second light source, to control the gain tilt in accordance with said difference.

2. An apparatus as in claim 1, wherein the gain tilt control unit controls the gain tilt to be constant.

3. An apparatus as in claim 1, wherein the gain tilt control unit monitors ASE received from the first end of the optical fiber.

4. An apparatus as in claim 1, wherein the apparatus has a gain band and the tilt gain control unit comprises:

a branching device which branches the ASE into a first signal and a second signal;

a first band-pass filter having a pass band which is included in the gain band of the apparatus, the first band-pass filter receiving the first signal and producing a filtered first signal;

a second band-pass filter having a pass band which is included in the gain band of the apparatus but is different from the pass band of the first band-pass filter, the second band-pass filter receiving the second signal and producing a filtered second signal; and a control mechanism which controls the first and second light sources to maintain a ratio between the power of the filtered first and second signals to be constant.

5. An apparatus as in claim 4, wherein:

the first light source includes a laser diode which receives a bias current, the bias current being controllable to control the pump light provided by the first light source, the second light source includes a laser diode which receives a bias current, the bias current being controllable to control the pump light provided by the second light source, and the control mechanism controls the bias currents received by the first and second light sources to maintain the ratio between the filtered first and second signals to be constant.

6. An apparatus for amplifying a signal light, comprising:

an optical fiber having first and second ends, the signal light propagating through the optical fiber from the first end to the second end;

a first light source providing pump light which propagates in the optical fiber from the first end to the second end;

a second light source providing pump light which propagates in the optical fiber from the second end to the first end, the pump lights provided by the first and second light sources causing the signal light to be amplified as the signal light propagates through the optical fiber; and a gain tilt control unit which monitors amplified spontaneous emission (ASE) at different wavelengths in the optical fiber, determines a gain tilt of the apparatus from a difference of the monitored ASE at the different wavelengths, and controls at least one of the group consisting of the power of the pump light produced by the first light source and the power of the pump light produced by the second light source, to control the gain tilt in accordance with said difference.

7. An apparatus as in claim 6, wherein the gain tilt control unit controls the gain tilt to be constant.

8. An apparatus as in claim 6, wherein the apparatus has a gain band and the tilt gain control unit comprises:

a branching device which branches the ASE into a first signal and a second signal;

a first band-pass filter having a pass band which is included in the gain band of the apparatus, the first band-pass filter receiving the first signal and producing a filtered first signal;

a second band-pass filter having a pass band which is included in the gain band of the apparatus but is different from the pass band of the first band-pass filter, the second band-pass filter receiving the second signal and producing a filtered second signal; and a control mechanism which controls the first and second light sources to maintain a ratio between the power of the filtered first and second signals to be constant.

9. An apparatus as in claim 8, wherein:

the first light source includes a laser diode which receives a bias current, the bias current being controllable to control the pump light provided by the first light source, the second light source includes a laser diode which receives a bias current, the bias current being controllable to control the pump light provided by the second light source, and the control mechanism controls the bias currents received by the first and second light sources to maintain the ratio between the filtered first and second signals to be constant.

10. An apparatus for amplifying a signal light, comprising:
- an optical fiber, the signal light propagating through the optical fiber;
- a light source providing pump light which propagates in the optical fiber and causes the signal light to be amplified as the signal light propagates through the optical fiber; and
- a gain tilt control unit which monitors amplified spontaneous emission (ASE) at different wavelengths in the optical fiber, determines a gain tilt of the apparatus from a difference of the monitored ASE at the different wavelengths, and controls the power of the pump light produced by the light source to control the gain tilt in accordance with said difference.

11. An apparatus as in claim 10, wherein the gain tilt control unit controls the gain tilt to be constant.

12. An apparatus as in claim 10, wherein the apparatus has a gain band and the tilt gain control unit comprises:
- a branching device which branches the ASE into a first signal and a second signal;
- a first band-pass filter having a pass band which is included in the gain band of the apparatus, the first band-pass filter receiving the first signal and producing a filtered first signal;
- a second band-pass filter having a pass band which is included in the gain band of the apparatus but is different from the pass band of the first band-pass filter, the second band-pass filter receiving the second signal and producing a filtered second signal; and
- a control mechanism which controls the light source to maintain a ratio between the power of the filtered first and second signals to be constant.

13. An apparatus as in claim 12, wherein:
- the light source includes a laser diode which receives a bias current, the bias current being controllable to control the pump light, and
- the control mechanism controls the bias current received by the light source to maintain the ratio between the filtered first and second signals to be constant.

14. A method for amplifying a signal light propagating through an optical fiber having first and second ends, comprising the steps of:
- propagating the signal light through the optical fiber from the first end to the second end;
- propagating first pump light at a first wavelength in the optical fiber from the first end to the second end so that the first pump light causes the signal light to be amplified as the signal light propagates through the optical fiber;
- propagating second pump light at a second wavelength in the optical fiber from the second end to the first end so that the second pump light causes the signal light to be amplified as the signal light propagates through the optical fiber, the first wavelength being a different wavelength than the second wavelength;
- monitoring amplified spontaneous emission (ASE) at different wavelengths in the optical fiber;
- determining a gain tilt from a difference of the monitored ASE at the different wavelengths; and
- controlling the power of the first pump light or the power of the second pump light to control the gain tilt in accordance with said difference.

15. A method as in claim 14, wherein the step of controlling comprises the step of:
- controlling the gain tilt to be constant.

16. A method as in claim 14, wherein the signal light is amplified by the first and second pump lights when the signal light is within a gain band, and the method further comprises the steps of:
- branching the ASE into a first signal and a second signal;
- filtering the first signal with a pass band which is included in the gain band, to produce a filtered first signal;
- filtering the second signal with a pass band which is included in the gain band but is different from the pass band for filtering the first signal, to produce a filtered second signal; and
- controlling the first and second pump lights to maintain a ratio between the power of the filtered first and second signals to be constant.

17. An apparatus as in claim 1, wherein the pump lights provided by the first and second light sources have specific wavelengths so that the signal light is amplified as the signal light propagates through the optical fiber.

18. An apparatus as in claim 6, wherein the pump lights provided by the first and second light sources have specific wavelengths so that the signal light is amplified as the signal light propagates through the optical fiber.

19. An apparatus as in claim 10, wherein the pump light has a specific wavelength so that the signal light is amplified as the signal light propagates through the optical fiber.

20. A method as in claim 14, wherein the first and second wavelengths cause the first and second pump lights, respectively, to amplify the signal light as the signal light propagates through the optical fiber.

* * * * *

UNITED STATES PATENT AND TRADEMARK OFFICE
CERTIFICATE OF CORRECTION

PATENT NO.    : 6,038,061
DATED         : March 14, 2000
INVENTOR(S)   : Yasushi Sugaya It is certified that error appears in the above-identified patent and that said Letters Patent is hereby corrected as shown below:

<u>Title page,</u>
Item [56], References Cited, please insert the following references which were omitted from the cover of the patent.

| | | |
|---|---|---|
| -- Huber | 5,140,456 | 08/1992 |
| Delavaux | 5,185,826 | 02/1993 |
| Aoki | 5,218,608 | 06/1993 |
| Chirravuri et al. | 5,287,216 | 02/1994 |
| Mizrahi et al. | 5,541,766 | 07/1996 |
| | | |
| EP 0439 867 B1 | 06/1994 | Europe |
| JP 4-149525 | 05/1992 | Japan |

Hiroo KANAMORI; "OPTICAL COMPONENTS AND FIBER TECHNOLOGIES FOR ERBIUM-DOPED FIBER AMPLIFIER", Fourth Optoelectronics Conference (OEC '92) Technical Digest 1992.

M. HAMADA et al.; "CHARACTERISTICS OF FUSION SPLICE OF $Er^{3+}$-DOPED FIBER FOR OPTICAL AMPLIFIER", Fourth Optoelectronics Conference (OEC '92) Technical Digest 1992.

C. R. Giles et al.; "DYNAMIC GAIN EQUALIZATION IN TWO-STAGE FIBER AMPLIFIERS"; Optical Amplifiers and Their Applications, Technical Digest 1990, Series Volume 13, MD2 48-51.

T. Kakinuma et al.; "GAIN AND NOISE CHARACTERISTICS OF ER-DOPED FIBER AMPLIFIERS WITH DIFFERENT PUMPING DIRECTIONS"; Optical Amplifiers and Their Applications; Technical Digest 1990, Series Volume 13, TuB1 126 - 129.

M. YOSHIDA et al.; "DEVELOPMENT OF COMPACT CHARACTERISTIC OF $Er^{3+}$-DOPED FIBER AMPLIFIERS FOR PRACTICAL APPLICATIONS"; Optical Amplifiers and Their Applications; Technical Digest 1990, Series Volumn 13; WDI 281 - 285.

K. SUZUKI et al.; "HIGH-GAIN ERBIUM-DOPED FIBER AMPLIFIER PUMPED BY 820 nm GaAlAs LASER DIODES"; Optical Amplifiers and Their Applications; Technical Digest 1990, Series Volume 13, MB4 20 - 23.

B. MIKKELSEN et al.; "HIGH RECEIVER SENSITIVITY AT 2.5 Gb/s OBTAINED WITH A HIGHLY EFFICIENT LOW NOISE DIODE PUMPED ERBIUM-DOPED FIBER AMPLIFIER"; Optical Amplifiers and Their Applications; Technical Digest 1991, Series Volume 13, FA4-1 192 - FA4-4 195.

UNITED STATES PATENT AND TRADEMARK OFFICE
CERTIFICATE OF CORRECTION

PATENT NO.   : 6,038,061
DATED        : March 14, 2000
INVENTOR(S)  : Yasushi Sugaya It is certified that error appears in the above-identified patent and that said Letters Patent is hereby corrected as shown below:

H. TAKENAKA et al.; "COMPACT SIZE AND HIGH OUTPUT POWER Er-DOPED FIBER AMPLIFIER MODULES PUMPED WITH 1.48µm MQW LDs"; Optical Amplifiers and Their Applications; Technical Digest 1991, Series Volume 13, FD2-1 254 - FD2-4 257.

A. WADA et al.; "HIGH-EFFICIENCY ERBIUM-DOPED FIBER AMPLIFIERS USING MODE FIELD DIAMETER ADJUSTING TECHNIQUE"; Optical Amplifiers and Their Applications; Technical Digest 1991, Series Volume 13, FD3-1 257 - FD3-4 261.

D. TANAKA et al.; "73.6km ATTENUATION FREE CONCATENATED FIBERS DOPED WITH DISTRIBUTED ERBIUM"; Optical Amplifiers and Their Applications; Technical Digest 1991, Series Volume 13, ThD4-1 156 - ThD4-4 159.

G. R. JACOBOVITZ-VESELKA et al.; "SINGLE-STAGE BOOSTER AMPLIFIER WITH TWO 980 nm PUMPS STABILIZED BY FIBER GRATING"; Optical Amplifiers and Their Applications; Technical Digest 1995, Series Volume 18; FC4-1 162 - FC4-4 165.

Y. TASHIRO et al.; "HIGH POWER ERBIUM-DOPED OPTICAL FIBER AMPLIFIER"; The Institute of Electronics, Information and Communication Engineers; Technical Report of IEICE, OCS95-86 (1995-10), pgs. 67-72.

M. SHIMIZU et al.; "HIGH SATURATING OPERATION OF 0.98 µm LASER DIODE PUMPED ERBIUM-DOPED FIBER AMPLIFIERS"; The Institute of Electronics, Information and Communication Engineers; Proceedings of the 1991 IEICE Fall Conference, Tamagawa University, pg. 4-239. (English Language Translation of Section 2)

K. OOSONO et al.; "RELIABILITY STUDY OF ER-DOPED OPTICAL FIBER"; The Institute of Electronics, Information and Communication Engineers; Proceesings of the 1992 IEICE Fall Conference, Tokyo Institute of Technology, pg. 4-282. (English language translation of Section 2 and Table 1)

K. OOSONO et al.; "STUDY OF HIGH OUTPUT POWER ER-DOPED FIBER AMPLIFIER"; The Institute of Electronics, Information and Communication Engineers; Proceedings of the 1992 IEICE Fall Conference, Tokyo Institute of Technology, pg. 4-283. (English language translation of Section 2)

UNITED STATES PATENT AND TRADEMARK OFFICE
CERTIFICATE OF CORRECTION

PATENT NO. : 6,038,061
DATED : March 14, 2000
INVENTOR(S) : Yasushi Sugaya

It is certified that error appears in the above-identified patent and that said Letters Patent is hereby corrected as shown below:

K. TAKANO et al.; "AN OPTICAL PRE-AMPLIFIER WITH AUTOMATIC GAIN CONTROL FUNCTION"; The Institute of Electronics, Information and Communication Engineers; Proceedings of the 1995 IEICE GENERAL Conference, Fukuoka Institute of Technology, pg. 513. (English language translation of Section 2)

J.M. P. DELAVAUX et al.; "HYBRID Er-DOPED FIBER AMPLIFIERS AT 980-1480 nm FOR LONG DISTANCE OPTICAL COMMUNICATIONS"; Electronics Letters 13th Aug. 1992, Vol. 28, No. 17.

S. G. GRUBB et al.; "ULTRAHIGH POWER DIODE-PUMPED 1.5-$\mu$m FIBER AMPLIFIERS"; OFC '96 Technical Digest Series, Vol. 2; February 25 - March 1, 1996. --

Signed and Sealed this

Twenty-seventh Day of August, 2002

*Attest:*

*Attesting Officer*

JAMES E. ROGAN
*Director of the United States Patent and Trademark Office*